US011905742B2

(12) United States Patent
Morrison et al.

(10) Patent No.: US 11,905,742 B2
(45) Date of Patent: Feb. 20, 2024

(54) INFORMATION HANDLING SYSTEM HOUSING LOCK

(71) Applicant: Dell Products L.P., Round Rock, TX (US)

(72) Inventors: Jason S. Morrison, Chadron, NE (US); Nicholas D. Grobelny, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 972 days.

(21) Appl. No.: 16/857,351

(22) Filed: Apr. 24, 2020

(65) Prior Publication Data

US 2021/0334417 A1    Oct. 28, 2021

(51) Int. Cl.
*G06F 1/16* (2006.01)
*E05B 73/00* (2006.01)
*E05B 47/00* (2006.01)

(52) U.S. Cl.
CPC ...... *E05B 73/0082* (2013.01); *E05B 47/0009* (2013.01); *G06F 1/1656* (2013.01); *E05B 2073/0088* (2013.01)

(58) Field of Classification Search
None
See application file for complete search history.

(56) References Cited

U.S. PATENT DOCUMENTS

| 11,514,196 B2* | 11/2022 | Grobelny | G07C 9/00174 |
| 2004/0004559 A1 | 1/2004 | Rast | |
| 2014/0325688 A1* | 10/2014 | Cashin | G06F 21/86 |
| | | | 726/34 |
| 2015/0330110 A1 | 11/2015 | Jaworski | |
| 2017/0249813 A1* | 8/2017 | Busby | G08B 13/128 |
| 2019/0012936 A1 | 1/2019 | Yazdi | |
| 2021/0225159 A1* | 7/2021 | Grobelny | G08B 29/16 |

* cited by examiner

*Primary Examiner* — Courtney L Smith
(74) *Attorney, Agent, or Firm* — ZAGORIN CAVE LLP; Robert W. Holland

(57) ABSTRACT

An information handling system housing is secured against unauthorized access with a security device integrated in the housing that selectively enables and disables screw movement relative to threads disposed in the housing. For instance, a freewheeling nut in the housing interfaces with an actuator that selectively releases or holds the freewheeling nut relative to the housing. When released, a screw coupled to the freewheeling nut cannot rotate relative to the threads of the freewheeling nut so that the screw maintains the housing secured until the freewheeling nut is held in position to allow removal of the screw.

9 Claims, 6 Drawing Sheets

INFORMATION HANDLING SYSTEM HOUSING LOCK

BACKGROUND OF THE INVENTION

Field of the Invention

The present invention relates in general to the field of information handling system security, and more particularly to an information handling system housing lock.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Often, end users can access sensitive enterprise information at remote locations through secure network interfaces, such as virtual private networks. Although this offers enterprise employees increased flexibility for performing enterprise duties while remote, it also presents a significant challenge to enterprise information technology professionals. Much of this information security challenge is met by encrypting information and password protecting information handling system access. In addition, at enterprise locations, such as enterprise office locations, enterprises typically enforce physical security of information handling systems by restricting access to areas where the information handling systems are used. Physical security of information handling system housings prevents malicious actors from breaking into the systems. Physical security of information handling systems also helps to prevent malicious actors from inserting malicious code and/or malicious hardware that enables subsequent attacks.

Portable information handling systems present enterprise information technology professionals an additional security challenge since the housings may be accessible to malicious actors when physical security is not enforced, such as if an end user is in a public place. In mere seconds, a malicious actor can unscrew a housing to access sensitive storage components within the housing, such as BIOS flash memory or other persistent storage devices. If a malicious actor is able to load malicious code that executes at the system root and then close the system to appear unaltered, anti-malware applications often cannot detect the intrusion. To prevent malicious actor access to a housing, information handling system housings are sometime secured by a physical lock and key, however, keys for physical locks can be difficult to track and distribute in an enterprise. Another alternative is to include an electromechanical or electromagnetic lock inside the housing that is activated by input code to the information handling system. These types of locks tend to be power hungry, heavy and complex. In addition, such locks are vulnerable to attack by unauthorized manipulation external to the housing, such as with magnets that can release the lock. Generally, if an integrated lock fails to function, the housing must be damaged or destroyed to gain access to the system. For instance, physical security systems generally must leave destructive evidence of some kind in the event of an unauthorized breach, so failure of a physical security system can result in damage that requires housing repairs.

SUMMARY OF THE INVENTION

Therefore, a need has arisen for a system and method which secures an information handling system housing from unauthorized breach.

In accordance with the present invention, a system and method are provided which substantially reduce the disadvantages and problems associated with previous methods and systems for securing an information handling system from unauthorized access. An actuator disposed in the housing selectively enables and disables a screw movement relative to thread in the housing. When the screw is restricted from moving relative to the threads, the housing is secured; enabling movement of the screw relative to the threads allows removal of the screw and access to the housing.

More specifically, an information handling system processes information with processing components disposed in a housing having at least first and second portions secured by a screw inserted through a housing opening and engaged with threads inside the housing. An actuator interfaces with the threads to selectively enable and disable screw movement relative to the threads so that the screw secures the housing when screw movement is disabled and allows access to the housing when screw movement is enabled. In one example embodiment, the actuator comprises a freewheeling nut that rotates within the housing to prevent a screw working against threads of the freewheeling nut. A member extends to engage notches formed in the nut to hold the nut from rotating when access to the housing is authorized, such as by input of a security code, and retracts when access to the housing is not authorized so that the nut rotates with screw rotation. The member is engaged and disengaged with the freewheeling nut by a crank having first and second shaped metal alloy wires, such as nickel titanium wires, interfaced with an embedded controller that applies current to the first and second nickel titanium wires to selectively shorten the wires and move the crank. Member extension into a freewheeling nut notch is performed through a biasing device so that the member enters the notch as the notch aligns with the member in response to screw rotation. In other embodiments, the actuator moves a plate to engage a slot in the screw and prevent vertical movement of the screw. Alternatively, the actuator selectively disposes the plate over the screw opening to prevent access to the screw.

The present invention provides a number of important technical advantages. One example of an important technical advantage is that an information handling system housing security system provides inexpensive, lightweight and power efficient housing lock actuation. The lock replaces a regular housing screw so that including the lock is an optional modular approach for manufactured information handling systems. The housing is secured from access without a physical key and destruction of the housing from unauthorized access prevent introduction of malicious hardware or software in the system without notice to an end user. Actuation of a security device by nickel titanium wire heat phase change is a low power and reliable solution with minimal moving parts and risk of failure.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system housing security device prevents and allows access to a housing interior by selectively enabling and disabling screw movement relative to threads that engage the screw and hold the housing closed. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
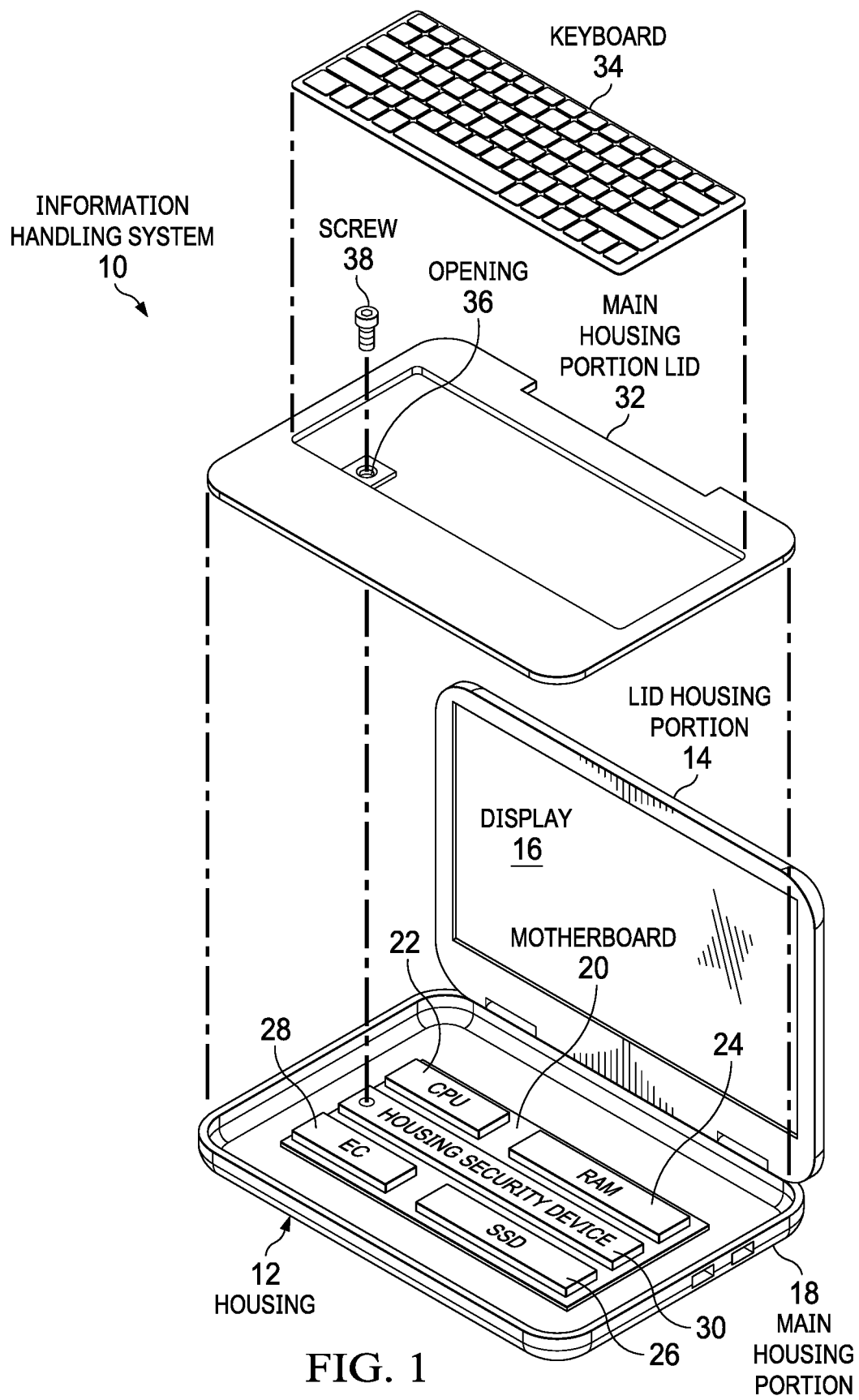
FIG. 1 depicts an exploded view of an information handling system having a security device to lock the information handling system housing.

Referring now to FIG. 1, an exploded view depicts an information handling system 10 having a security device 30 to lock the information handling system housing 12. In the example embodiment, information handling system 10 has a clamshell portable configuration with a lid housing portion 14 that integrates a display 16 and a main housing portion 18 that contains processing components that cooperate to process information. For example, a motherboard 20 couples in the interior or main housing portion 18 to support communication between a central processing unit (CPU) 22 that executes instructions and a random access memory (RAM) 24 that stores the instructions and information. A solid state drive (SSD) 26 provides persistent storage of information that is retrieved to RAM 24 for use by CPU 26. An embedded controller 28 executes firmware instructions stored in integrated flash memory or other non-transient memory to manage operating conditions, such as power consumption, thermal conditions and input device interactions. Main housing portion 18 is enclosed by a main housing lid portion 32 held in place by a screw 38 inserted through an opening 36 to couple with threads of a housing security device 30. A keyboard 34 fits over main housing lid portion 32 to hide opening 36. In order to access the processing components within main housing portion 18, keyboard 34 is pried free from snaps and screw 38 is unscrewed to remove main housing portion lid 32. In alternative embodiments, screw 38 may insert at openings located in other positions, such at the bottom or side surfaces of main housing portion 18. The example embodiment depicts screw 38 inserted at an upper portion of the main housing, however, as described below, screw 38 may insert at a bottom portion of the housing or any location that prevents housing disassembly.

Unauthorized access of main housing portion 18 can provide a malicious actor with an opportunity to implant malicious code in SSD 26, embedded controller 28 or other memory. To prevent unauthorized access, housing security device 30 selectively enables and disables an end user's ability to loosen screw 38 and access the interior of main housing portion 18. In one example embodiment, the screw spins freely when access is not authorized as if the threads are destroyed. In another example embodiment, vertical motion of the screw is restricted so that unauthorized attempts to remove the screw create excessive torque. In yet another example embodiment, the screw opening is blocked to prevent access to the screw. Embedded controller 28 includes a security firmware module that authorizes access if an access code is input to keyboard 34, such as by enable operation of the screw for a predetermined time period. Once the authorization time period has passed, the screw is again disabled from removal. In this manner, access to the processing components is restricted by unauthorized users who do not input the security code.

Figure 2:
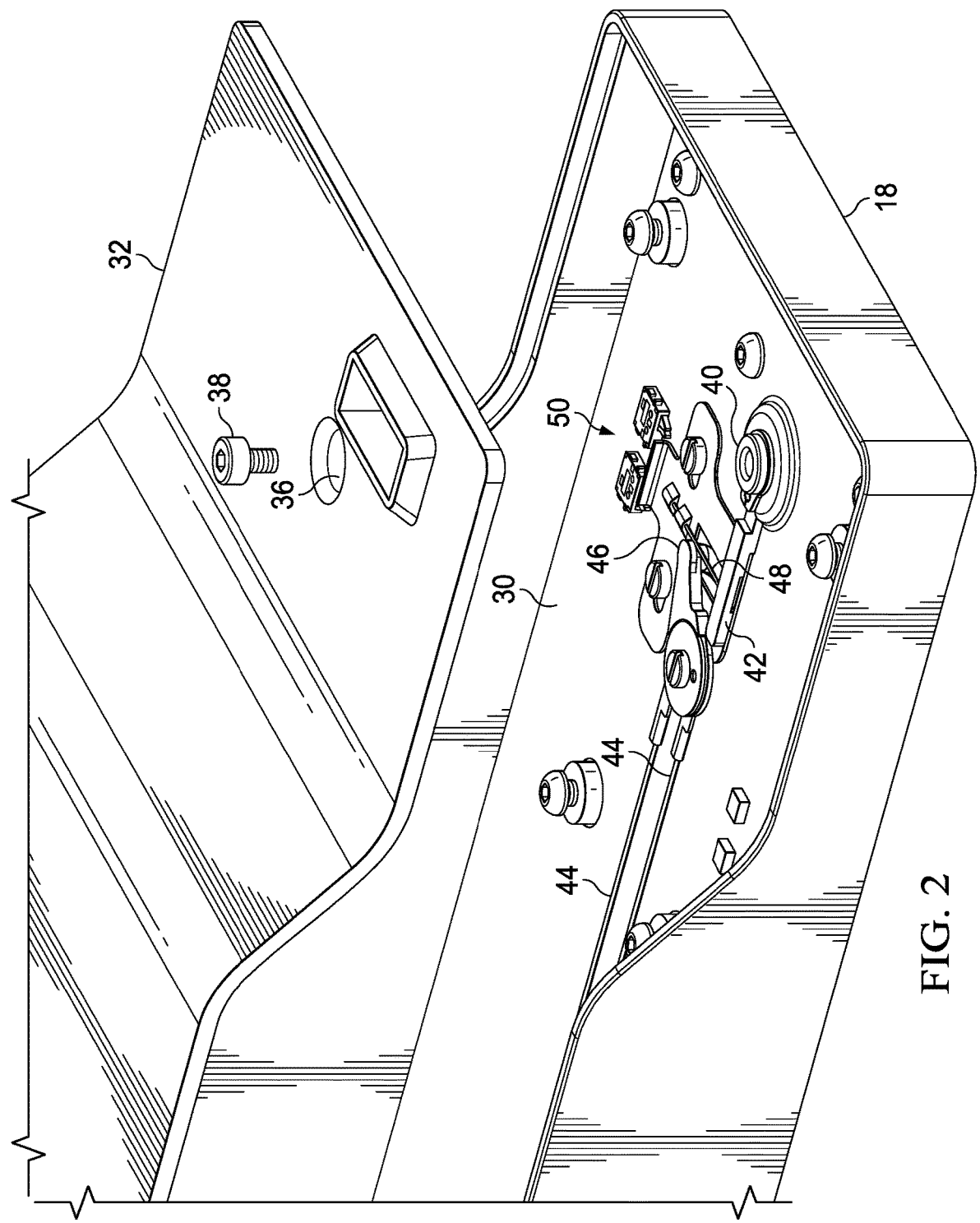
FIG. 2 depicts an example embodiment of an information handling system security device having a freewheeling nut and crank-actuated lock pin member.

Referring now to FIG. 2, an example embodiment depicts an information handling system 10 security device 30 having a freewheeling nut 40 and crank 46 actuated lock pin member 42. In the example embodiment of FIG. 2, screw 38 inserts into the housing from a bottom surface to couple with threads disposed at a bottom surface of a motherboard. In the secured state, screw 38 inserts through opening 36 of main housing portion 18 to engage with threads of freewheeling nut 40. In one example embodiment, freewheeling nut 40 holds threads still in the clockwise direction associated with screw insertion and rotates freely in the counterclockwise direction associated with screw removal. Once screw 38 is engaged with threads of freewheeling nut 40, rotating screw 38 will not move the screw relative to threads of the freewheeling nut, but rather will rotate the freewheeling nut. To permit removal of screw 38 by rotation relative to the threads of freewheeling nut 40, freewheeling nut 40 is held in a static position relative to main housing portion 18 by actuation of lock pin member 42 towards freewheeling nut 40 with a crank 46. First and second nickel titanium wires 44 couple at opposing sides of crank 46 so that one wire extends lock pin member 42 and the other wire releases lock pin member 42. Nickel titanium wires 44, also known as muscle wires, shorten in response to application of heat as the alloy changes crystalline state. Heat is applied to each nickel titanium wire by a command from the embedded controller that passes a current through the wire. In alternative embodiments, alternative shape metal alloy wires may be used in the place of nickel titanium alloy wires. A spring wire biasing device 48 biases lock pin member 42 towards freewheeling nut 40 when crank 46 is actuated to ensure full engagement with freewheeling nut 40 as described below. Limit switches 50 monitor the position of crank 46 to aid in control current to achieve a desired position.

Figure 3:
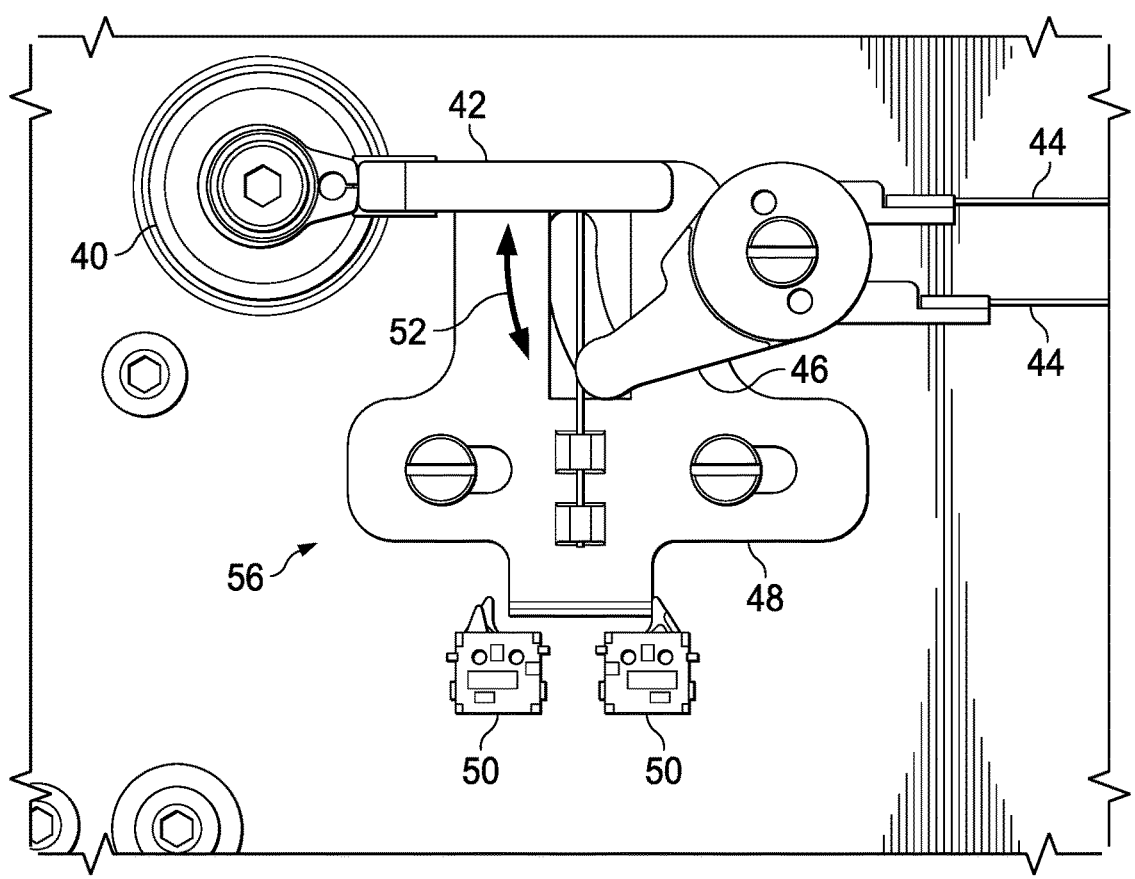
FIG. 3 depicts crank positions of the actuator that engage and disengage the lock pin member and freewheeling nut.

Referring now to FIG. 3, crank positions are depicted for the actuator 56 that engage and disengage the lock pin member 42 and freewheeling nut 40. In the example embodiment, crank 46 is actuated by shortening of the lower nickel titanium wire to pull spring wire biasing device toward the distal limit switch 50 that activates to indicate the secure position is selected with freewheeling nut 40 free to rotate. Upon activation of the upper nickel titanium wire 44 with current and heat, crank 46 rotates from the retracted position as indicated by arrow 52 to push spring wire biasing device towards freewheeling nut 40 until the right limit switch 50 indicates complete movement of crank 46 to an extended position. Crank 46 rotates past a perpendicular location so that spring wire biasing device 48 works against return of crank 46 towards the retracted position. In one example embodiment, the lower nickel titanium wire 44 is re-activated after a predetermined time or other factor to ensure the housing does not remain unintentionally unsecured.

Figure 4:
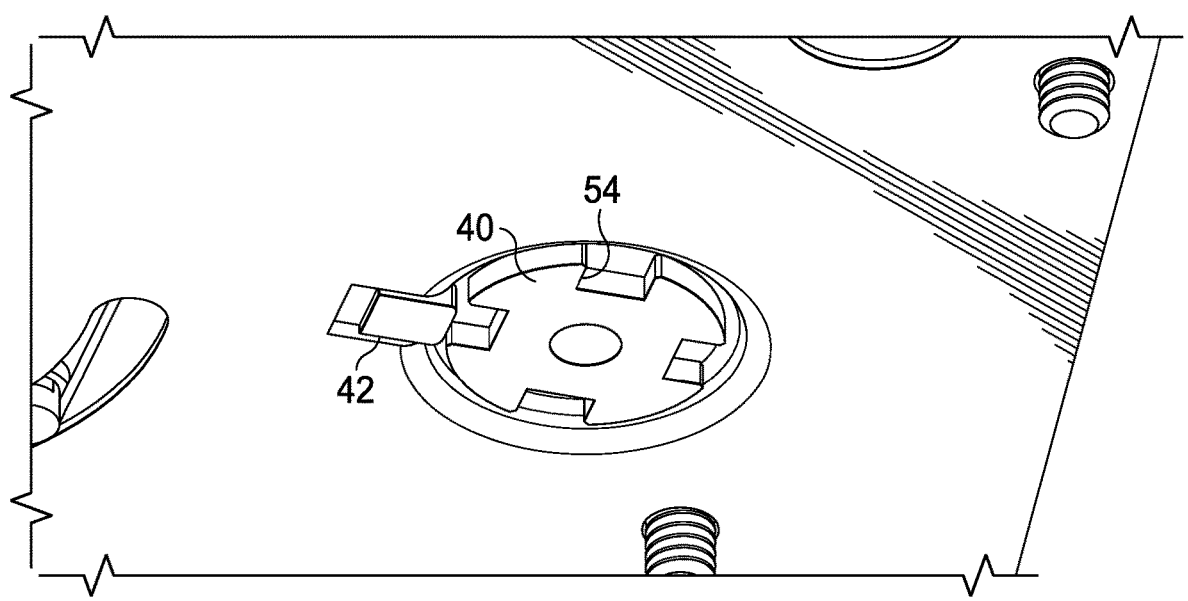
FIG. 4 depicts a bottom view of the lock pin member aligned with the freewheeling nut notch.

Referring now to FIG. 4, a bottom view depicts the lock pin member 42 aligned with the freewheeling nut 40 notch 54. In the example embodiment, if lock pin member 42 does not align with a notch 54 at actuation of the nickel titanium wire 44, then spring wire biasing device 48 biases lock pin member 42 against the outer circumference of freewheeling nut 40 until notch alignment results due to rotation of freewheeling nut in response to screw rotation. After lock pin member 42 engages notch 54, freewheeling nut 40 is held still relative to the housing so that threads of the screw work to remove the screw as the screw turns.

Figure 5:
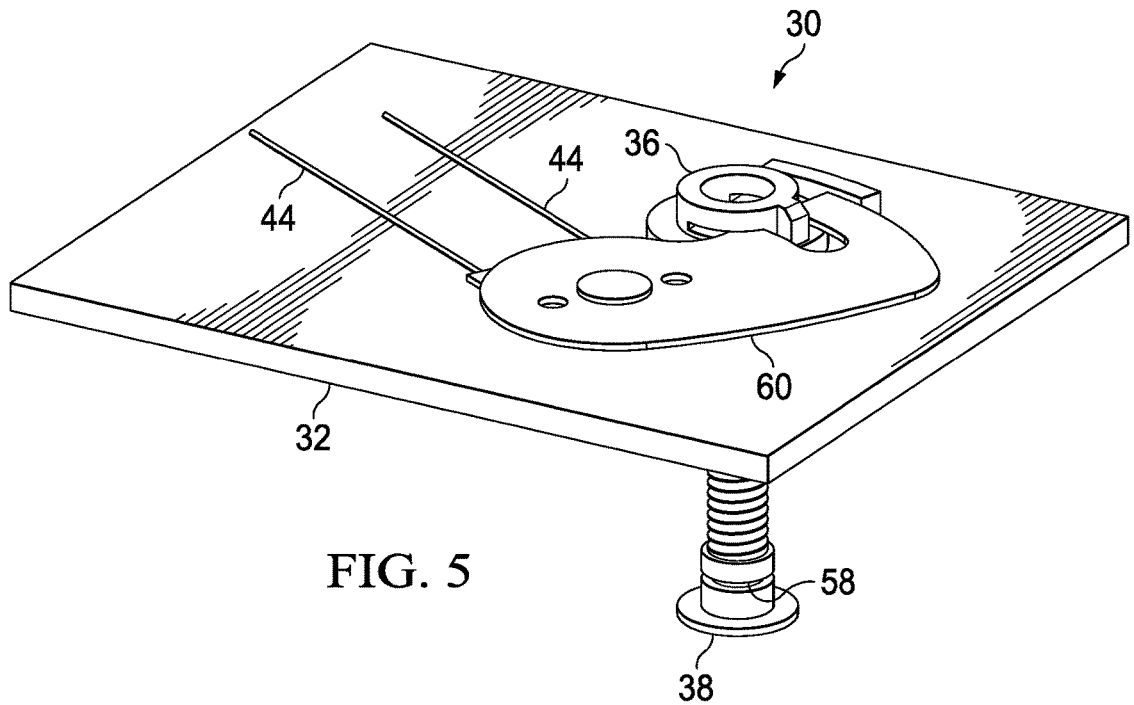
FIG. 5 depicts an alternative embodiment of the security device having a pivoting screw lock plate.

Referring now to FIG. 5, an alternative embodiment of the security device 30 depicts a pivoting screw lock plate 60. In the example embodiment, pivoting screw lock plate 60 rotates in response to actuation of nickel titanium wire 44 between a first position, as shown, clear of opening 36 and a second position inserted into opening 36. Screw 38 has a slot 58 size to accept the thickness of pivoting screw lock plate 60 when the plate pivots to insert into opening 36 at a slot formed at the base of main housing lid portion 32.

Figure 6:
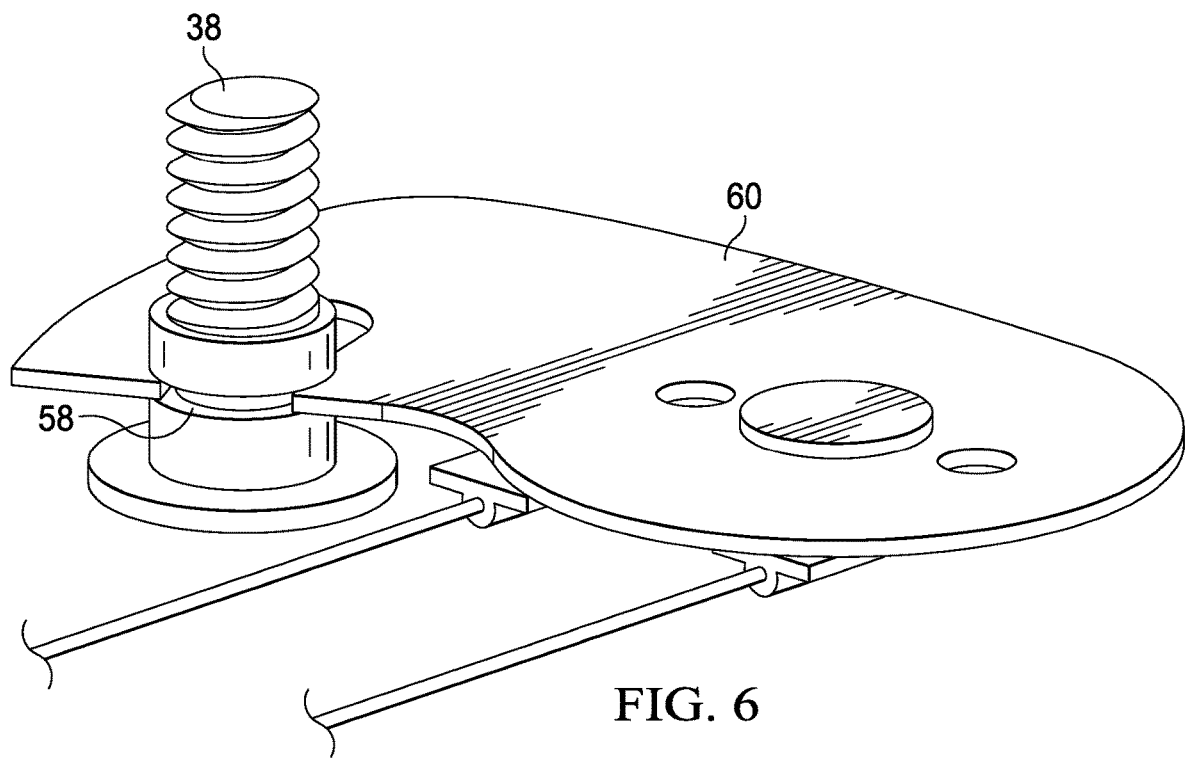
FIG. 6 depicts engagement of the pivoting screw plate lock and the screw slot.

Referring now to FIG. 6, engagement of the pivoting screw lock plate 60 and the screw 38 slot 58 is depicted. Once the plate inserts into slot 58, attempts to unscrew screw 38 work pivoting screw lock plate 60 against housing lid portion 32 so that loosening of screw 38 is resisted by increasing torque that prevents vertical motion of screw 38 relative to threads formed in the opening and removal of screw 38.

Figure 7A:
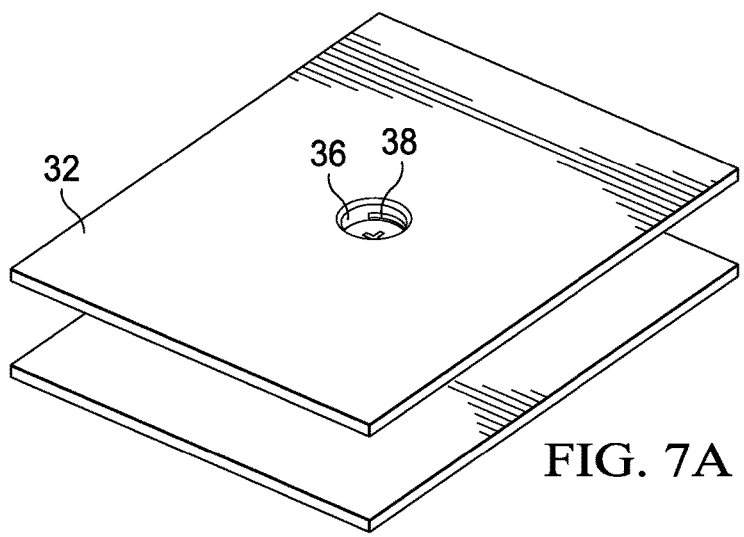
FIGS. 7A, 7B and 7C depict an alternative security device that slides a shutter over a screw opening to prevent access to the screw.
Figure 7B:
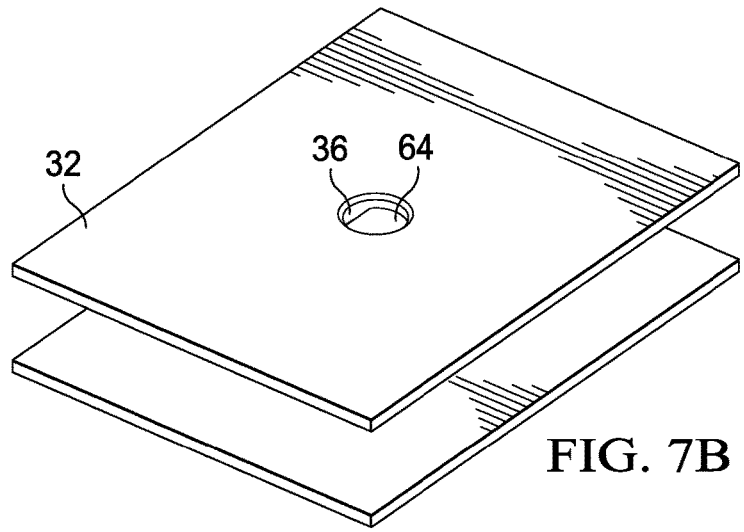
Figure 7C:
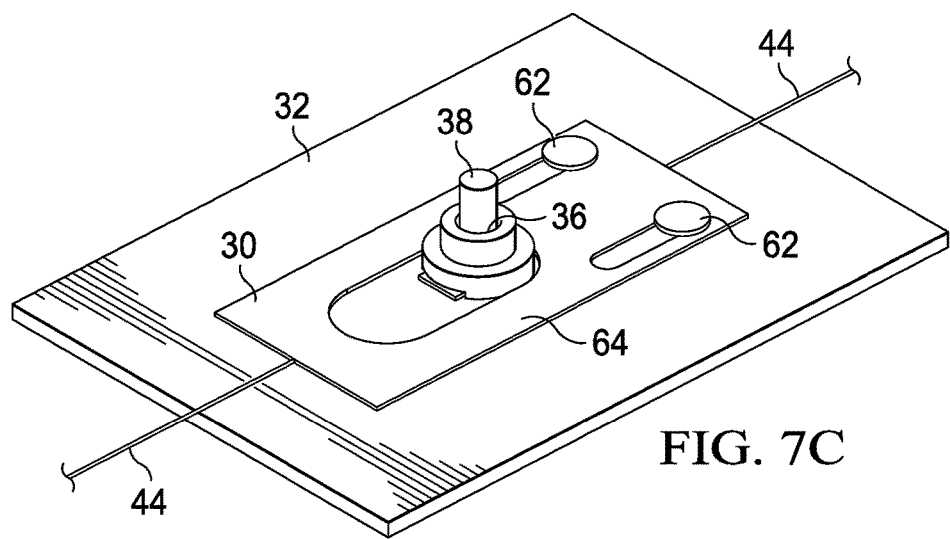

Referring now to FIGS. 7A, 7B and 7C, an alternative security device 30 is depicted that slides a shutter 64 over a screw 38 opening 36 to prevent access to the screw. FIG. 7A depicts an upper view of the main housing lid portion 32 with shutter 64 slid to expose screw 38. FIG. 7B depicts the upper view of main housing lid portion 32 slid to prevent access to screw 38. FIG. 7C depicts a bottom view of main housing lid portion 32 with shutter 64 slid to a locked position at slide guides 62. Shutter 64 slides to the opposite sides of slide guides 62 to close opening 36. Shutter 64 is slid in each direction by a nickel titanium wire 44 that pulls shutter 64 in opposing directions in response to heating as described above.

Figure 8A:
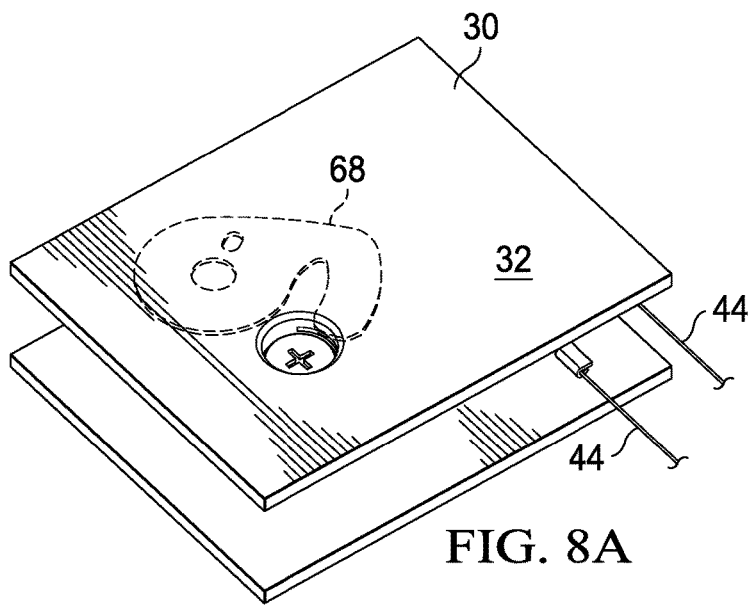
FIGS. 8A, 8B and 8C depict an alternative security device that pivots a shutter over a screw opening to prevent access to the screw.
Figure 8B:
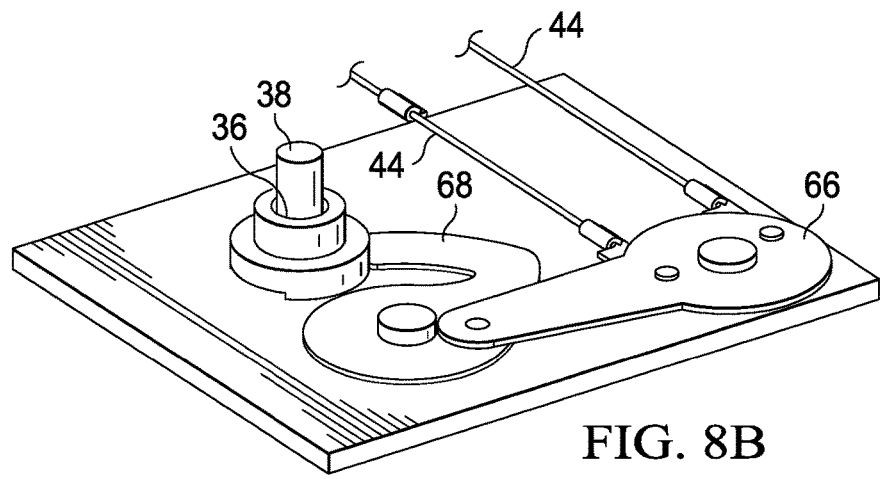
Figure 8C:
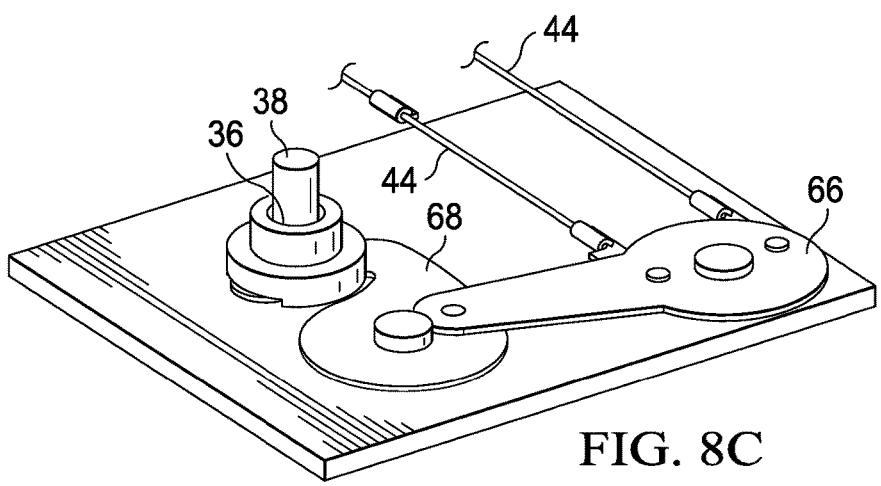

Referring now to FIGS. 8A, 8B and 8C, an alternative security device 30 is depicted that pivots a pivot shutter plate 68 over a screw 38 opening 36 to prevent access to the screw 38. FIG. 8A depicts screw 38 exposed at opening 36 with a pivot shutter plate 68 disposed beneath main housing lid portion 32 and pivoted back away from opening 36. FIG. 8B depicts a bottom view of pivot shutter plate 68 pivoted away from opening 36 with a secondary pivot plate 66 that amplifies motion imparted by heating of nickel titanium wire 44. FIG. 8C depicts pivoting shutter plate 68 rotated to insert through a slot at the base of opening 36 to block access to screw 38 through opening 36. As described above, one nickel titanium wire heats to retract pivoting shutter plate 68 from opening 36 when access to the housing is authorized and the other nickel titanium wire heats to extend pivoting shutter plate 68 into opening 36 when access to the housing is not authorized.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having at least first and second portions, the first portion having an opening sized to accept a screw, the second portion having threads aligned with the opening;
   a screw inserted in the opening to engage the threads, the screw coupling the first and second portions together;
   a processor disposed in the housing and operable to execute instructions to process information;
   a memory interfaced with the processor and operable to store the instructions and information;
   a controller disposed in the housing and interfaced with the processor, the controller operable to execute instructions stored in non-transient memory;
   an actuator interfaced with controller and the threads, the actuator operable to selectively disable and enable movement of the screw relative to the threads; and
   security instructions stored in the non-transient memory to command the actuator to enable or disable movement of the screw relative to the threads based upon a predetermined condition.

2. The information handling system of claim 1 wherein:
   the threads comprise threads formed in a nut, the nut rotationally coupled at the second portion to rotate relative to the second portion; and
   the actuator comprises a member that extends and retracts relative to the nut, the member extending into contact with the nut to enable movement of the screw relative to the threads by preventing rotation of the nut relative to the second portion and retracting away from contact with the nut to disable movement of the screw relative to the threads by releasing the nut to rotate relative to the second portion.

3. The information handling system of claim 2 wherein the nut outer circumference has plural notches the member inserts into to prevent rotation of the nut relative to the second portion.

4. The information handling system of claim 3 wherein the actuator comprises a biasing device that biases the member towards insertion into the notch when the actuator is enabled.

5. The information handling system of claim 4 wherein the actuator comprises a crank interfaced with the biasing device, the crank rotated between enable and disable positions with current applied to a nickel titanium wire.

6. The information handling system of claim 1 wherein the screw has a slot and the actuator has a planar surface that inserts into the slot to work against vertical movement of the screw in the threads.

7. The information handling system of claim 1 wherein the actuator has a planar surface that covers the opening to disable access to the screw through the opening.

8. The information handling system of claim 1 wherein the actuator further comprises:
 a shape metal alloy wire that when heated shortens to disable movement of the screw relative to the threads; and
 a second shape metal alloy wire that when heated shortens to enable movement of the screw relative to the threads.

9. The information handling system of claim 1 wherein the predetermined condition comprise input of a security code that authorizes access to the housing.

* * * * *